United States Patent [19]
Gillier

[11] Patent Number: 5,237,980
[45] Date of Patent: Aug. 24, 1993

[54] ON-BOARD FUEL VAPOR RECOVERY SYSTEM HAVING IMPROVED CANISTER PURGING

[75] Inventor: William C. Gillier, Chatham, Canada
[73] Assignee: Siemens Automotive Limited, Chatham, Canada
[21] Appl. No.: 984,406
[22] Filed: Dec. 2, 1992
[51] Int. Cl.$^5$ .............................................. F02M 33/02
[52] U.S. Cl. ..................... 123/520; 123/458; 251/129.15; 251/129.05
[58] Field of Search ............... 123/520, 519, 518, 516, 123/521, 458; 251/129.15, 129.05

[56] References Cited

U.S. PATENT DOCUMENTS

| | | | |
|---|---|---|---|
| 3,802,403 | 4/1974 | Dewick | 123/520 |
| 4,304,391 | 12/1981 | Yomaguchi | 251/129.05 |
| 4,628,887 | 12/1986 | Mitchell | 123/520 |
| 4,700,750 | 10/1987 | Cook. | |
| 4,813,647 | 3/1989 | Yogi | 251/129.05 |
| 4,867,126 | 9/1989 | Yonekawa et al. | |
| 4,901,702 | 2/1990 | Beicht et al. | |
| 4,901,974 | 2/1990 | Cook et al. | |
| 4,951,637 | 8/1990 | Cook. | |
| 4,953,514 | 9/1990 | Beicht | 123/520 |
| 4,986,246 | 1/1991 | Kessler de Vivie | 123/520 |
| 5,020,771 | 6/1991 | Nakatsukasa | 251/129.05 |
| 5,143,345 | 9/1992 | Miki | 251/129.15 |
| 5,178,116 | 1/1993 | Fehrenbach | 123/520 |
| 5,184,591 | 2/1993 | Sausner | 123/520 |
| 5,188,141 | 2/1993 | Cook | 123/520 |

*Primary Examiner*—Carl S. Miller
*Attorney, Agent, or Firm*—George L. Boller; Russel C. Wells

[57] ABSTRACT

An irregularity that might otherwise be present in the flow characteristic of the system is cured by damping the motion of the armature of the CPS valve in two ways. One way comprises incorporating a "step" into the confronting faces of the armature and stator at their interface across the air gap. The other way comprises guiding the armature motion by means of a brass tube with sufficiently small running clearance such that pneumatic damping occurs.

18 Claims, 3 Drawing Sheets

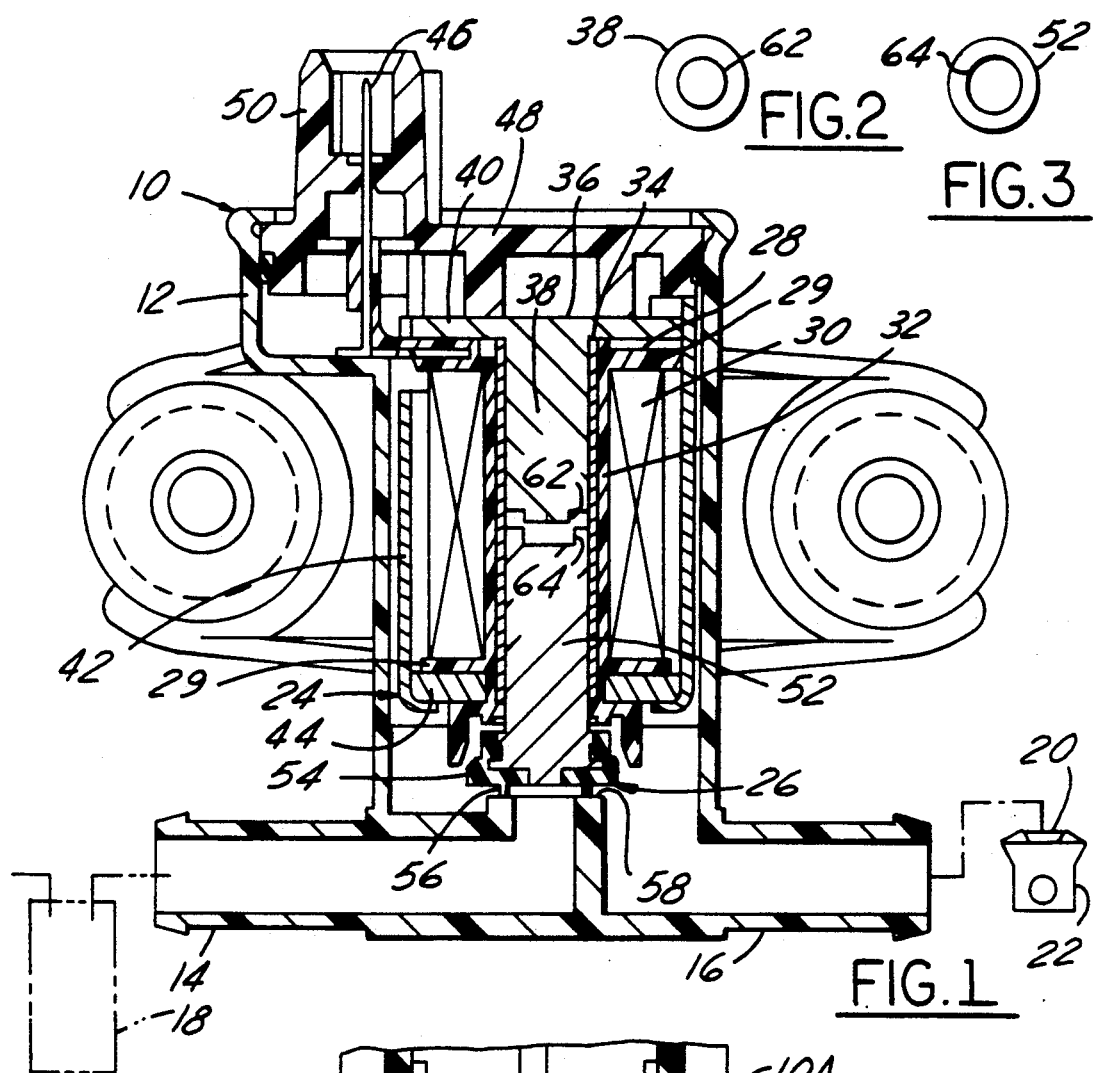
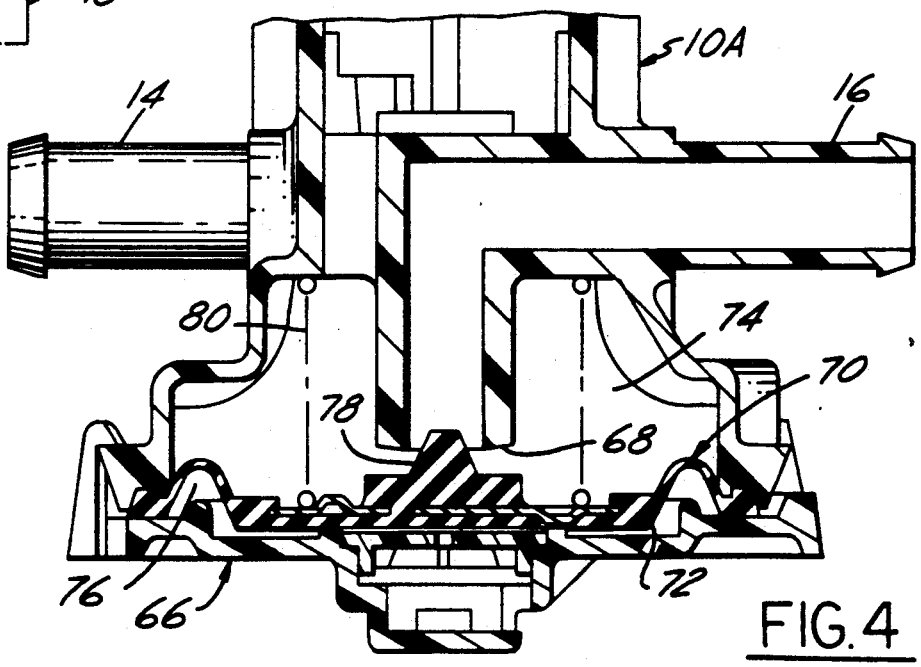

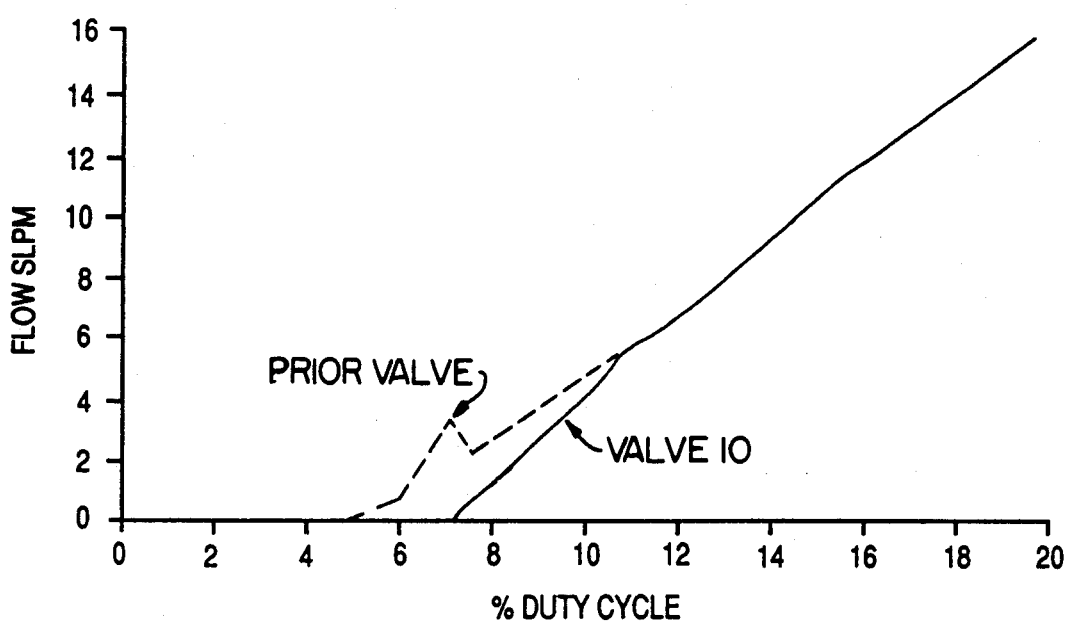
FIG.7
FIG.8
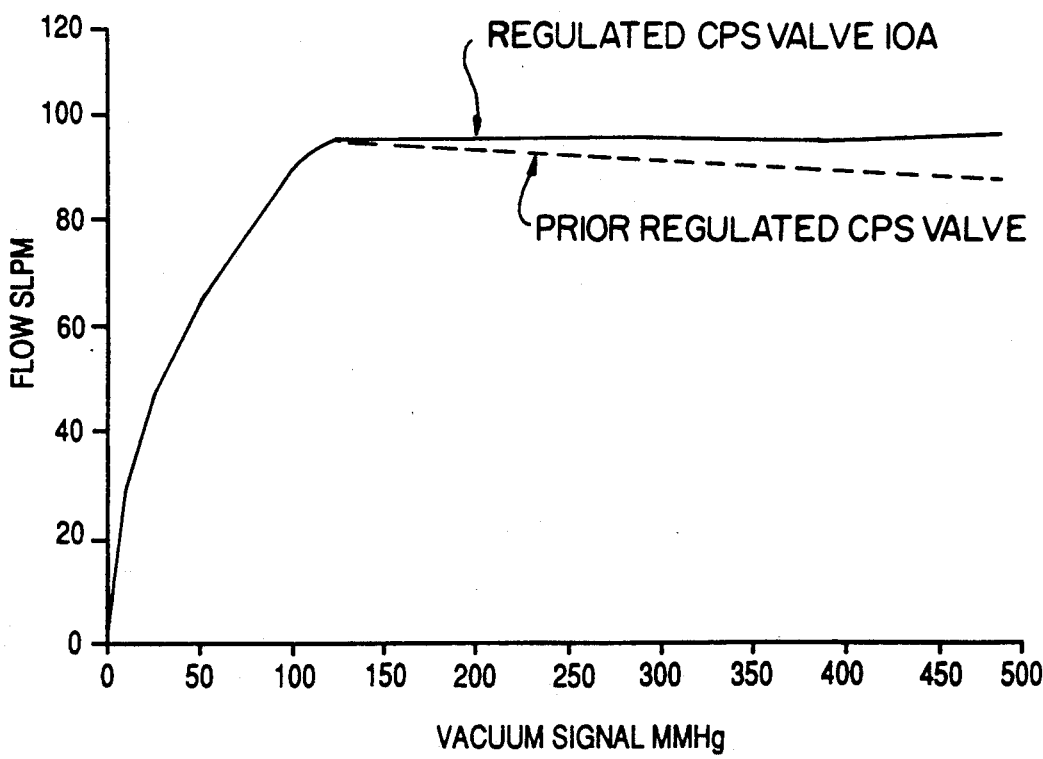

ON-BOARD FUEL VAPOR RECOVERY SYSTEM HAVING IMPROVED CANISTER PURGING

FIELD OF THE INVENTION

This invention relates to on-board fuel vapor recovery systems of automotive vehicles that periodically purge collected vapors to the engine for combustion.

BACKGROUND AND SUMMARY OF THE INVENTION

Stricter performance criteria for on-board fuel vapor recovery systems of automotive vehicles impose greater criticality on system components, such as canister purge solenoid (CPS) valves. A typical control strategy for a CPS valve comprises energizing its solenoid by means of a pulse width modulated signal from an electrical control circuit. The extent to which the CPS valve opens is related to the duty cycle of the modulation, and this can be portrayed graphically by plotting flow through the CPS valve as a function of duty cycle. Ideally, this relationship would be exactly linear over the full operating range, but in fact such is not the case for certain existing CPS valves in which the armature motion is largely underdamped and the armature and stator have flat confronting faces at the air gap that separates them.

Within the lower duty cycle range, an irregular change may occur in the flow characteristic. For mass-produced CPS valves, the exact duty cycle at which this irregular change occurs is apt to vary from valve to valve, and consequently the possibility of such variance in any given valve may detrimentally affect compliance of the vapor recovery system in which it is installed with relevant specifications.

The present invention arises in part through the recognition that this irregular change is a naturally occurring phenomenon in a CPS valve whose armature and stator have flat confronting faces at the air gap that separates them, and whose armature motion is largely underdamped. As the armature approaches the stator, it causes an increase in the inductance of the solenoid because more of the armature is placed in the magnetic circuit. The increase in inductance causes the solenoid's impedance to increase, slowing the solenoid's response to a pulse width modulated signal and attenuating the magnetic attraction force exerted on the armature. Underdamped armature motion results in more sudden change in solenoid inductance, and it is such type of change that is believed to give rise to the irregular change.

The present invention provides a solution that substantially eliminates such irregularity. The solution comprises two components: 1) the armature-stator interface is designed with a "step" to impart more damping to the armature motion; and 2) the armature is dimensioned in relation to a tube that guides its motion such that the armature motion is also pneumatically damped. In summary, limiting the rate at which the armature can move limits the rate of change of the solenoid's inductance, and this significantly attenuates the aforementioned irregularity such that it may be considered substantially eliminated.

A further benefit of imparting increased damping to the armature motion is a reduction in the ripple content of the purge flow through the CPS valve. The flow through a typical pulse width modulated CPS valve contains a ripple component due to the fact that the armature is being modulated. Peaks of these ripples can have an adverse effect on a system's compliance with relevant specifications. Increased damping reduces the peak amplitude of the ripple excursions. The resulting improvement is especially significant during the generally lower flow rates occurring at engine idle.

A still further improvement is obtained by incorporating a regulator into the CPS valve and providing the regulator with a tapered pintle type regulator valve element.

The known state of the art is represented by the following U.S. Pat. Nos. 4,700,750; 4,867,126; 4,901,702; 4,901,974; and 4,951,637.

The foregoing features, advantages, and benefits of the invention, along with those already mentioned, will be seen in the ensuing description and claims which should be considered in conjunction with the accompanying drawings. The drawings disclose a presently preferred embodiment of the invention according to the best mode contemplated at this time for carrying out the invention.

BRIEF DESCRIPTION OF THE DRAWINGS

FIG. 1 is a longitudinal cross-sectional view through a CPS valve embodying principles of the invention.

FIG. 2 is an axial end view of one of the parts of the CPS valve shown by itself.

FIG. 3 is an axial end view of another of the parts of the CPS valve shown by itself.

FIG. 4 is a fragmentary view of a modified form of CPS valve.

FIGS. 5-8 are various graph plots relating to the invention.

DESCRIPTION OF THE PREFERRED EMBODIMENT

Figure 5:
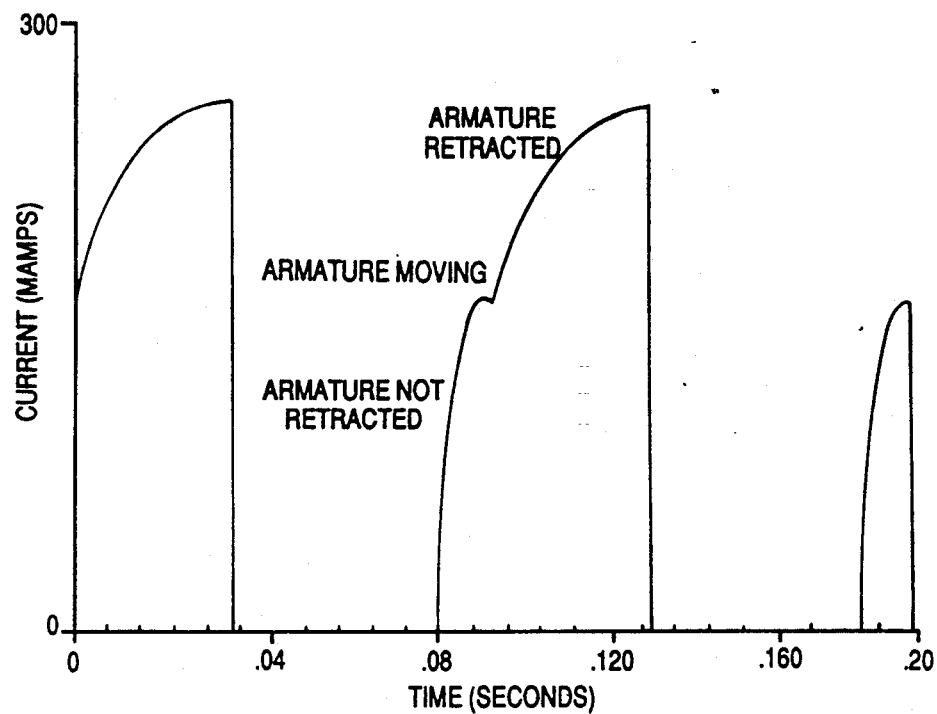

FIGS. 1-3 illustrate a CPS valve 10 which comprises a housing 12 fabricated from a suitable plastic material and having an inlet nipple 14 and an outlet nipple 16. When the CPS valve is installed in an on-board fuel vapor recovery system of an automotive vehicle, inlet nipple 14 is placed in communication with a vapor collection canister 18, and outlet nipple 16 is placed in communication with an intake manifold 20 of an internal combustion engine 22 that powers the automotive vehicle.

CPS valve 10 further comprises a solenoid 24 for operating a valve 26 that controls the flow through the CPS valve between inlet nipple 14 and outlet nipple 16. Solenoid 24 comprises a length of wire wound on a plastic bobbin 28 between upper and lower bobbin flanges 29 to form an electromagnetic coil 30. Bobbin 28 comprises a tubular core 32 whose interior is lined by a circular cylindrical brass tube 34 that is pressed into, or otherwise secured with respect to, core 32. A ferromagnetic pole piece 36 is disposed at the upper end of the solenoid and comprises a cylindrical stator 38 that is snugly fitted into approximately the upper half of tube 34 and a circular flange 40 at the upper end of stator 38 that extends radially outwardly to the O.D. of bobbin 28. A cylindrical ferromagnetic shell 42 laterally encloses the solenoid, extending downwardly from flange 40 to wrap over the outer edge of a ferromagnetic ring 44 that is disposed against the lower bobbin flange 29. The ends of the wire forming coil 30 are joined to upstanding electrical terminals 46 at one side of the upper end of the solenoid. The solenoid is retained within housing 12 by a plastic cover 48 that closes the open upper end of the housing above the solenoid and is secured therein by deforming the edge of the housing over and onto the cover's perimeter. Cover 48 includes provision for sealing the interior of the housing from the outside while allowing the distal ends of terminals 46 to pass through to the interior of a surround 50 that cooperates with the terminals to form a connector plug that mates with a complementary connector plug (not shown) for connecting the solenoid to an electrical control circuit (not shown) for operating the CPS valve.

Valve 26 comprises a generally cylindrical ferromagnetic armature 52 and a generally circular non-metallic valve element 54 mounted on the lower end of armature 52. The upper portion of armature 52 has a circular cylindrical outer wall that fits closely within tube 34. Valve element 54 has a circular lip 56 at the bottom that is shown in FIG. 1 seated on a circular internal valve seat 58 that is provided internally of housing 12 at the end of an inlet passage opposite inlet nipple 14. Valve element 54 also has a circular shoulder that faces upwardly toward a circular groove in a portion of bobbin 28 that is spaced below lower flange 29. One axial end of a helical bias spring 60 is disposed against that shoulder, and the other axial end of the spring is disposed in that groove, causing the spring to resiliently bias valve 26 to the position of FIG. 1 showing valve 26 seated on seat 58 thereby closing CPS valve 10 to flow between inlet nipple 14 and outlet nipple 16.

The upper end face of armature 52 confronts the lower end face of stator 38 within the interior of tube 34 across an air gap. The lower end face of the stator is flat except for a circular cylindrical protrusion 62 at the center. The upper end face of the armature is flat except for a circular cylindrical intrusion 64 at the center which is in alignment with protrusion 62. The diameter of intrusion 64 is just slightly larger than that of protrusion 62.

When coil 30 is not being energized, stator 38 exerts no magnetic attraction force on armature 52. When coil 30 is energized, stator 38 exerts magnetic attraction force on armature 52, with the magnitude of the force being related to the duty cycle of the electric input to the coil. Accordingly, valve 26 opens to an extent determined by the duty cycle input to the solenoid.

The clearance between the circular cylindrical outer surface of armature 52 and the surrounding I.D. of tube 34 is made sufficiently small that a certain pneumatic damping of the armature motion occurs when the duty-cycling electric current in the solenoid commands armature movement. The fit of pole piece 36 to the solenoid closes the upper end of tube 34. It is only via the close clearance between armature 52 and tube 34 that air can pass into and out of the air gap space between the confronting faces of the armature and stator as the armature moves, and this is what creates the pneumatic damping of the armature motion.

The "stepped" relationship of the confronting surfaces of the armature and stator across the intervening air gap, provides a gap-force relationship that has a more gradual transition over the region where the flow characteristic is prone to irregularity, and this serves to substantially eradicate such undesired effects.

The magnetic flux path for the flux issued by coil 30 comprises stator 38, armature 52, ring 44, shell 42, and flange 40. Because tube 34 is a relatively magnetically impermeable material, it has no effect on the magnetic circuit. When valve 26 unseats from seat 58, purge flow from canister 18 passes into inlet nipple 14, through the space between valve 26 and seat 58, and from outlet nipple 16 to manifold 20.

FIG. 4 presents a portion of another form of CPS valve 10A which is like CPS valve 10 except for the inclusion of a vacuum regulator 66. Vacuum regulator 66 functions to deliver to the upstream side of valve seat 58 vacuum which is regulated to a reasonably steady value despite wider variations in the actual manifold vacuum that is delivered to outlet nipple 16. In CPS valve 10A the passage extending into housing 12 from outlet nipple 16 is provided with a valve seat 68. Vacuum regulator 66 comprises a diaphragm-operated valve mechanism 70 comprising a diaphragm 72 which divides a lower portion of housing 12 into two chambers 74 and 76 on opposite sides of the diaphragm. A central region of the diaphragm carries a valve element 78 that coacts with valve seat 68. The diaphragm is resiliently biased by means of a coil spring 80 such that valve element 78 is resiliently urged away from seat 68. Chamber 74 is communicated to manifold vacuum while chamber 76 is communicated to atmosphere. The pressure differential between actual manifold vacuum and atmosphere acting on the diaphragm will serve to position valve element 78 relative to seat 68 such that the vacuum in chamber 74 is regulated to a reasonably steady value despite fluctuations in actual manifold vacuum. This in turn maintains a steadier differential across the open valve 26 and the possibility for making the CPS flow characteristic less sensitive to manifold vacuum variations over the regulation range. The regulation also benefits from the pintle shape of valve element 78.

FIG. 5 is a representative graph plot of current flow in coil 30 in response to the application of a rectangular voltage waveform to the coil.

Figure 6:
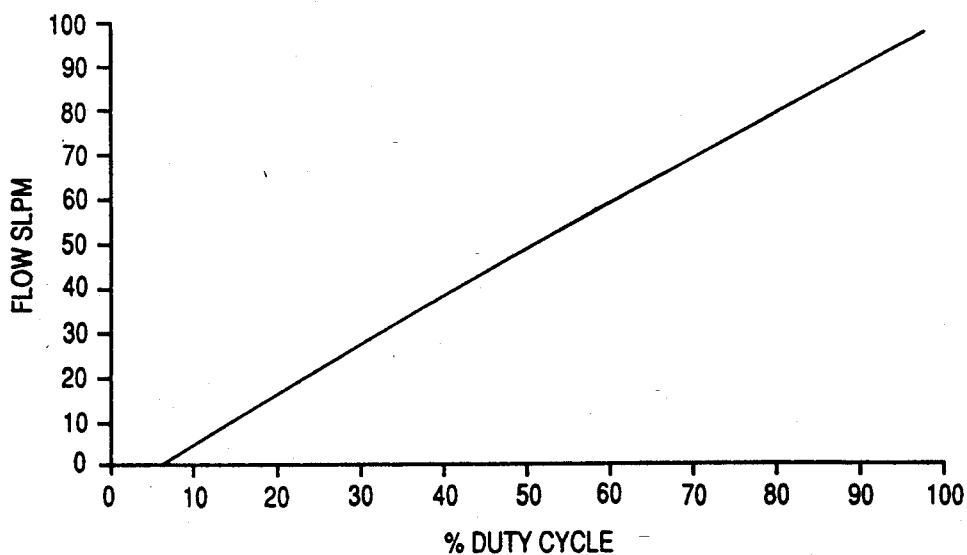

FIG. 6 is a representative graph plot of flow through CPS valve 10 as a function of the duty cycle of the energizing input. FIG. 7 is an enlargement of the lower range of the graph plot of FIG. 6 showing how the irregularity that is characteristic of the earlier CPS valve is alleviated by the invention.

FIG. 8 is a representative graph plot of flow through CPS valve 10A as a function of intake manifold vacuum showing the improvement that is attained by the present invention over a prior vacuum regulated canister purge valve.

While a presently preferred embodiment of the invention has been illustrated and described, it should be appreciated that principles are applicable to other embodiments.

What is claimed is:

1. An on-board fuel vapor recovery system for a fuel system of an internal combustion engine of an automotive vehicle comprising a canister in which volatile fuel vapors are collected, a canister purge solenoid (CPS) valve comprising an inlet port, an outlet port, a valve member controlling flow between said inlet port and said outlet port, resilient bias means resiliently biasing said valve member to close the CPS valve to flow between said inlet port and said outlet port, and a solenoid for operating said valve member, means placing said inlet port in communication with said canister, means placing said outlet port in communication with an intake manifold of the internal combustion engine, means placing said solenoid under the control of an electrical control system that controls the purging of said canister to said intake manifold, said CPS valve's solenoid comprising a relatively magnetically permeable stator, said valve member comprising a relatively magnetically permeable armature, said stator and said armature being disposed to have confronting faces defining an air gap across which said stator exerts magnetic attraction force on said armature for operating said valve member against opposite force of said resilient bias means to open the CPS valve to flow between said inlet port and said outlet port when said solenoid is energized by electric current from said electrical control system, the intensity of the magnetic force and hence the extent to which said valve member opens the CPS valve to flow between said inlet port and said outlet port being related to the intensity of the electric current from said electrical control system, characterized in that said stator and said armature are disposed within a relatively magnetically impermeable tube, in that said confronting faces of said stator and said armature are shaped to congruently complement each other with one comprising an intrusion that is congruently complements a protrusion on the other, and in that said resilient bias means is disposed other than between said confronting faces.

2. An on-board fuel vapor recovery system for a fuel system of an internal combustion engine of an automotive vehicle as set forth in claim 1 characterized further in that said protrusion is on said stator and said intrusion is in said armature.

3. An on-board fuel vapor recovery system for a fuel system of an internal combustion engine of an automotive vehicle as set forth in claim 2 characterized further in that said tube guides motion of said armature toward and away from said stator and has a sufficiently close guiding fit to said armature that motion of said armature is pneumatically damped.

4. An on-board fuel vapor recovery system for a fuel system of an internal combustion engine of an automotive vehicle as set forth in claim 3 characterized further in that said confronting face of said stator is flat and circular, except for said protrusion, said protrusion is a right circular cylinder that is protrudes concentrically from said confronting face of said stator, said confronting face of said armature is flat and circular, except for said intrusion, said intrusion is a right circular cylinder that intrudes concentrically from said confronting face of said armature, said confronting faces are concentric, and the diameter of said intrusion is slightly larger than that of said protrusion.

5. An on-board fuel vapor recovery system for a fuel system of an internal combustion engine of an automotive vehicle as set forth in claim 1 characterized further in that one said confronting faces is flat and circular, except for said protrusion, said protrusion is a right circular cylinder that is protrudes concentrically from said one confronting face, the other of said confronting faces is flat and circular, except for said intrusion, said intrusion is a right circular cylinder that intrudes concentrically from said other confronting face, said confronting faces are concentric, and the diameter of said intrusion is slightly larger than that of said protrusion.

6. An on-board fuel vapor recovery system for a fuel system of an internal combustion engine of an automotive vehicle as set forth in claim 5 characterized further in that said tube guides motion of said armature toward and away from said stator and has a sufficiently close guiding fit to said armature that motion of said armature is pneumatically damped.

7. An on-board fuel vapor recovery system for a fuel system of an internal combustion engine of an automotive vehicle as set forth in claim 1 characterized further in that said tube guides motion of said armature toward and away from said stator and has a sufficiently close guiding fit to said armature that motion of said armature is pneumatically damped.

8. An on-board fuel vapor recovery system for a fuel system of an internal-combustion engine of an automotive vehicle as set forth in claim 1 characterized further in that the CPS valve includes a regulator that is effective for intake manifold vacuum greater than a predetermined regulated vacuum regulates the vacuum actually delivered to the intake manifold side of said valve member to such predetermined regulated vacuum.

9. An on-board fuel vapor recovery system for a fuel system of an internal combustion engine of an automotive vehicle as set forth in claim 1 characterized further in that said tube comprises a brass tube.

10. A canister purge solenoid (CPS) valve for an on-board fuel vapor recovery system for a fuel system of an internal combustion engine of an automotive vehicle comprising a canister in which volatile fuel vapors are collected, said canister purge solenoid (CPS) valve comprising an inlet port adapted to be placed in communication with said canister, an outlet port adapted to be placed in communication with an intake manifold of such an internal combustion engine, a valve member controlling flow between said inlet port and said outlet port, resilient bias means resiliently biasing said valve member to close the CPS valve to flow between said inlet port and said outlet port, and a solenoid for operating said valve member that is adapted for control by an electrical control system that for controlling the purging of the canister to the intake manifold, said CPS valve's solenoid comprising a relatively magnetically permeable stator, said valve member comprising a relatively magnetically permeable armature, said stator and said armature being disposed to have confronting faces defining an air gap across which said stator exerts magnetic attraction force on said armature for operating said valve member against opposite force of said resilient bias means to open the CPS valve to flow between said inlet port and said outlet port when said solenoid is energized by electric current from said electrical control system, the intensity of the magnetic force and hence the extent to which said valve member opens the CPS valve to flow between said inlet port and said outlet port being related to the intensity of the electric current from said electrical control system, characterized in that said stator and said armature are disposed within a relatively magnetically impermeable tube, in that said confronting faces of said stator and said armature are shaped to congruently complement each other with one comprising an intrusion that is congruently complements a protrusion on the other, and in that said resilient bias means is disposed other than between said confronting faces.

11. An on-board fuel vapor recovery system for a fuel system of an internal combustion engine of an automotive vehicle as set forth in claim 10 characterized further in that said protrusion is on said stator and said intrusion is in said armature.

12. An on-board fuel vapor recovery system for a fuel system of an internal combustion engine of an automotive vehicle as set forth in claim 11 characterized further in that said tube guides motion of said armature toward and away from said stator and has a sufficiently close guiding fit to said armature that motion of said armature is pneumatically damped.

13. An on-board fuel vapor recovery system for a fuel system of an internal combustion engine of an automotive vehicle as set forth in claim 12 characterized further in that said confronting face of said stator is flat and circular, except for said protrusion, said protrusion is a right circular cylinder that is. protrudes concentrically from said confronting face of said stator, said confronting face of said armature is flat and circular, except for said intrusion, said intrusion is a right circular cylinder that intrudes concentrically from said confronting face of said armature, said confronting faces are concentric, and the diameter of said intrusion is slightly larger than that of said protrusion.

14. An on-board fuel vapor recovery system for a fuel system of an internal combustion engine of an automotive vehicle as set forth in claim 10 characterized further in that one of said confronting faces is flat and circular, except for said protrusion, said protrusion is a right circular cylinder that is protrudes concentrically from said one confronting face, the other of said confronting faces is flat and circular, except for said intrusion, said intrusion is a right circular cylinder that intrudes concentrically from said other confronting face, said confronting faces are concentric, and the diameter of said intrusion is slightly larger than that of said protrusion.

15. An on-board fuel vapor recovery system for a fuel system of an internal combustion engine of an automotive vehicle as set forth in claim 14 characterized further in that said tube guides motion of said armature toward and away from said stator and has a sufficiently close guiding fit to said armature that motion of said armature is pneumatically damped.

16. An on-board fuel vapor recovery system for a fuel system of an internal combustion engine of an automotive vehicle as set forth in claim 10 characterized further in that said tubes guides motion of said armature toward and away from said stator and has a sufficiently close guiding fit to said armature that motion of said armature is pneumatically damped.

17. An on-board fuel vapor recovery system for a fuel system of an internal combustion engine of an automotive vehicle as set forth in claim 10 characterized further in that the CPS valve includes a regulator that is effective for intake manifold vacuum greater than a predetermined regulated vacuum regulates the vacuum actually delivered to the intake manifold side of said valve member to such predetermined regulated vacuum.

18. An on-board fuel vapor recovery system for a fuel system of an internal combustion engine of an automotive vehicle as set forth in claim 1 characterized further in that said tube comprises a brass tube.

* * * * *